United States Patent Office 3,532,719
Patented Oct. 6, 1970

3,532,719
PROCESS FOR PRODUCTION OF ISOCHROMANS
Ernst T. Theimer, Rumson, N.J., assignor to International Flavors & Fragrances Inc., New York, N.Y., a corporation of New York
No Drawing. Filed Oct. 28, 1968, Ser. No. 771,337
Int. Cl. C07d 7/20
U.S. Cl. 260—345.2
10 Claims

ABSTRACT OF THE DISCLOSURE

Process for producing isochromans by reaction of aromatic hydrocarbons with an alkylene oxide in the presence of aluminum chloride to produce an aryl alkanol-aluminum chloride complex, partially deactivating the aluminum chloride, and treating the aryl alkanol-aluminum chloride complex with formaldehyde to produce an isochroman.

BACKGROUND OF THE INVENTION

The production of isochromans has been shown in the art and certain novel isochromans have recently been disclosed with an outstanding musk fragrance. Such isochromans especially adapted for perfumery by virtue of their fragrance properties have been disclosed in Heeringa & Beets U.S. Pat. 3,360,530.

A number of routes are available for the production of isochromans, and one of the most straightforward and best of these routes is treatment of a Friedel-Crafts reactant with an alkylene oxide under Friedel-Crafts conditions to form an aryl alkanol. The aryl alkanol is then isolated and thereafter reacted with formaldehyde to cyclialkylate the alcohol. The efficiency of this multistage process leaves much to be desired because of yield impairment due to the large amount of working required.

THE INVENTION

Briefly, the present invention provides a simplified, economical process for producing isochromans which comprises reacting a Friedel-Crafts reactant with an alkylene oxide in the presence of aluminum chloride to form an aryl alkanol, partially deactivating the aluminum chloride after formation of the aryl alkanol, and cyclialkylating the aryl alkanol with formaldehyde in the presence of the partially deactivated aluminum chloride to form the isochroman. The present process provides a wide variety of useful substituted and unsubstituted isochromans. The term "partially deactivated" is used herein to mean that the aluminum chloride complexed with the aryl alkanol is modified so that it can no longer promote alkylation of the aryl alkanol or the unreacted Friedel-Crafts reactant, yet is sufficiently active to permit and promote cyclialkylating the aryl alkanol.

Schematically, in one aspect the process can be represented as follows:

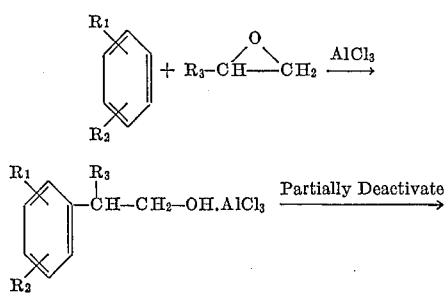

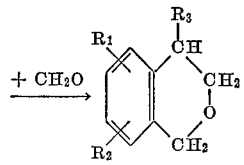

wherein $R_1$ and $R_2$ can be hydrogen, lower alkoxyl, lower alkyl, or taken together can form a ring such as benzo, cyclopentano, or cyclohexano, and the like, or a substituted ring such as naphtho, mono- or polyalkyl benzo, mono- or polyalkyl cyclopentano, mono- or polyalkyl cyclohexano, and the like, and $R_3$ is hydrogen or lower alkyl.

A Friedel-Crafts reactant is herein taken to mean any chemical compound which is capable of undergoing a mole-for-mole condensation with an alkylene oxide. Examples of such reactants include aromatic hydrocarbons such as benzene, toluene, xylene, naphthalene, and the like, as well as any of such hydrocarbons having substituted chlorine or bromine atoms, such as monochlorobenzene, monobromobenzene, and the like. Further included are aromatic ethers such as anisole, phenetole, diphenyl ether and the like; aromatic aldehydes such as benzaldehyde, toluic aldehyde and the like; and aromatic ketones such as acetophenone, benzophenone, and the like. Mixtures of such reactants can also be used. They can occur naturally or be mixed as desired.

The Friedel-Crafts reactants used as starting materials in the process of this invention can be mono-, di- or more highly alkyl-substituted. The disubstituted hydrocarbons can also form a ring fused to benzene. Thus, the present invention can be applied to benzene, toluene, xylene, ethylbenzene, triethylbenzene, indane, polyalkyl indane, naphthalene, tetralin, polyalkyl tetralin, and the like. For production of musk fragrance agents the preferred aromatic hydrocarbon starting materials include tetra- and pentamethyl indanes and tetramethyl tetralins. The alkyl groups are preferably lower alkyl, especially those having from one to four carbon atoms.

The alkylene oxide is one which will provide a β-aryl ethanol upon reaction with the aryl material. An alkyl group can be a substituent on the β-carbon atom of the ethanol. It will accordingly be appreciated that 1,2-epoxy hydrocarbons are used to form the aryl alkanol. The preferred alkylene oxides for use in the present process are ethylene oxide and propylene oxide.

The aluminum chloride used as catalyst for the reaction should preferably be finely divided, anhydrous, and substantially free from metallic impurities such as ferric chloride (i.e., less than about 1000 p.p.m.) to minimize unwanted side reactions and obtain satisfactory yields. It is generally preferred to carry out the reaction with a substantially equimolar quantity of aluminum chloride and epoxide, although an excess of one or the other can be employed.

This alkylene oxide addition reaction is highly exothermic, so that the alkylene oxide should be added slowly with good agitation and considerable cooling to maintain the temperature. In order to prevent side reactions, it is desirable to maintain the temperature below about 10° C. Use of too low temperature will result in reaction taking place at an unduly low velocity and may be most disadvantageous because the buildup of unreacted alkylene oxide in the reaction mixture may result in polymerization and loss of yield. It is accordingly preferred to operate in the preferred range of about −40° C. to about 10° C.

The time for the alkylene oxide reaction is generally determined by the cooling which can be provided and by the need to obviate local overheating. Generally, the speed of the reaction will depend upon the facility with which heat of reaction can be dissipated to prevent overheating and reduction of yield. The reaction can conveniently be carried out with conventional equipment in from 2 to 16 hours.

The relative amounts of Friedel-Crafts reactant and alkylene oxide will depend upon a variety of factors including the presence of a reaction vehicle, as herein described. The quantities can be varied over a range, but it is desirable that the amount of Friedel-Crafts reactant be at least stoichiometric. When the described chlorinated reaction vehicle is not used, it is generally preferred to use a molar excess of Friedel-Crafts reactant up to about ten times the amount of oxide to insure maximum utilization of the oxide and maintain low viscosity. When a halogenated reaction vehicle is used, it is preferred that the amount of Friedel-Crafts reactant and alkylene oxide be substantially stoichiometric to assure maximum utilization of the Friedel-Crafts reactant.

In one aspect of the invention, when the Friedel-Crafts reactant is solid or relatively viscous at the reaction temperature, the reaction with alkylene oxide is desirably carried out in a halogenated aromatic hydrocarbon reaction vehicle to facilitate the reaction and provide improved yields. Suitable halogenated reaction vehicles are monochlorobenzene, bromobenzene, o-dichlorobenzene, and like vehicles which are liquid at the reaction temperature. The preferred vehicle is monochlorobenzene because of its relatively low boiling point and the ease with which it can be removed from the reaction mixture on completion of the process.

In this aspect of the process, it is preferred to add the alkylene oxide dissolved in an additional quantity of the chlorinated hydrocarbon solvent, as moderation of the reaction can be achieved and by-product production can be described.

After formation of the aryl alkanol as a complex with aluminum chloride, the aluminum chloride is partially deactivated by adding a material containing a free hydroxyl group. Such materials include water, lower alcohols, particularly primary alcohols such as methanol, ethanol, propanol, and the like, and lower glycols such as ethylene glycol, propylene glycol, and the like. Water and methanol are the preferred partial deactivating agents.

The molar ratio of deactivating agent to aluminum chloride can be from about 1:1 to 2:1. At ratios much below 1:1 partial deactivation will not occur, while at ratios higher than 2:1 the reaction mass becomes overly viscous, and total deactivation can also occur.

Prior to the cyclialkylation, the deactivating agent is added to the reaction mass at the same temperature at which the initial reaction to provide the aryl alkanol is carried out. It is highly desirable to maintain this temperature since the aluminum chloride complex at higher temperature would cause the aryl alkanol to react with any remaining Friedel-Crafts reactants in the reaction mixture and result in the formation of unwanted high-boiling products. As soon as the deactivating agent has been added, the low temperature need no longer be maintained.

After deactivation of the aluminum chloride, the aryl alkanol is directly treated with formaldehyde to cyclialkylate it and provide the desired isochroman. No additional catalyst or other material is required. Those skilled in the art will understand from the present description that formaldehyde per se can be added to the reaction mixture, or that equivalent formaldehyde sources such as paraformaldehyde, trioxymethylene, methylal, or other materials furnishing formaldehyde under the reaction conditions can be used. It is preferred that the formaldehyde be provided in a substantially anhydrous form.

The quantity of formaldehyde should be at least stoichiometric with respect to the aryl alkanol produced in the first stage, although substantial excesses of formaldehyde can be used. Use of too great an excess of formaldehyde, however, is merely wasteful of this reactant and also complicates recovery of the finished isochromans.

The cyclialkylation of the aryl alkanol is carried out at temperatures sufficient to provide relatively rapid reaction. The cyclialkylation reaction usually commences at about 20–30° C. when paraformaldehyde is used to furnish formaldehyde to the reaction. The relatively mild exotherm will raise the temperature to 50° C. or higher if cooling is not used. Temperatures up to about 100° C. can be used, but yields are reduced at temperatures much above 50°. It is accordingly preferred to carry out this step of the process at temperatures of 20° to 50° C.

The cyclialkylation with formaldehyde is relatively rapid, and can generally be carried out in from ten minutes to two hours.

The present process can be carried out at pressures above or below atmospheric. For the reactants usually employed in the process, there is no advantage in the use of pressures other than atmospheric, and atmospheric pressures are accordingly preferred.

One of the advantages obtained according to the present process is that the Friedel-Crafts reactant which is not consumed in the production of the aryl alkanol is substantially unaffected by the deactivation and reaction with formaldehyde. Such unreacted starting material can accordingly readily be recovered during purification of the isochroman product.

After cyclialkylation of the aryl alkanol with formaldehyde, the reaction product is washed and the isochroman produced is recovered. The reaction mass is diluted with water and neutralized as with aqueous sodium hydroxide solution. The usual washing with aqueous sodium chloride and water are generally helpful in recovering the isochroman produced. The washed reaction mixture is then treated by conventional techniques such as distillation, extraction, preparative chromatography, and the like, to obtain highly purified isochroman. Fractional distillation is a preferred method of recovering the isochroman.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 6-oxa-1,1,2,3,3,8-hexamethyl-2,3,5,6,7,8-hexahydro-1H-benz[f]indene A five-liter reaction flask fitted with a stirrer, reflux condenser, dropping funnel, and a subsurface addition tube is immersed in a Dry ice-isopropanol bath and charged with 665 g. of aluminum chloride, 487.5 g. of monochlorobenzene and 940 g. of 1,1,2,3,3-pentamethyl indane. No exotherm is observed as the contents are cooled to —20° C. An additional 487.5 g. of monochlorobenzene is mixed with 290 g. of propylene oxide, and half of this mixture is charged to the flask through the addition tube during 40 minutes. A strong exothermic action occurs, and the addition is carried out so that the temperature of the flask contents is about —190° C. The remaining monochlorobenzene and propylene oxide mixture is added during the next 45 minutes while the temperature is maintained at —18 to —20° C. After addition is completed, the flask contents are stirred for an additional 15 minutes and a 5 cc. sample is withdrawn.

Then, 135 g. of water is slowly added during one-half hour and the temperature of the flask contents is permitted to rise to 1° to 2° C. so that ice does not form. After completion of the water addition 126 g. of paraformaldehyde is added, and stirring is continued for five hours while the temperature is maintained at 0° to 5° C.

The reaction mass is then poured over a mixture of one kg. of ice and one kg. of water, whereupon the temperature rises to 32° C. The mixture is stirred ten minutes, and the lower layer is drained from the mass. Five hundred grams of 50% aqueous sodium hydroxide and 1240 g. of water are added to the remaining upper layer, and this is permitted to stand overnight.

Seven hundred additional grams of water is added and then 500 g. of concentrated hydrochloric acid is used to acidify the mixture. An additional kg. of water is added and the aqueous phase is separated from the upper organic phase. The organic material is then washed with one kg. of 10% aqueous sodium chloride twice and 975 g. of organic material is obtained. The monochlorobenzene and any remaining water are stripped off under vacuum, and the organic material is flash distilled to obtain 881 g. of product. The product is washed with 580 g. of 50% aqueous sodium hydroxide diluted to 1740 g. with water, then twice with one kg. of water and once with one kg. of hot (55° C.) water. The remaining 880 g. of organic material is drained into a two-liter distillation flask and distilled at 89° to 139° C. at 0.9 mm. Hg to obtain 812 g. of product.

Based upon the amount of pentamethyl indane starting material the overall yield of the title compound is 65.5%.

EXAMPLE II

A five-liter reaction flask fitted out as in Example I is charged with 532.5 g. of 85% pentamethyl indane and 71.4 g. of anhydrous aluminium chloride. The mixture is cooled to −15° C. and 29.1 g. of propylene oxide in 185.2 g. of 85% pentamethyl indane is slowly charged to the flask below the surface of the liquid. The temperature is maintained between −10° and −15° C., and the reaction mixture is held at that temperature for about one hour with stirring.

Then 25.5 g. of methanol is slowly added during one-half hour. The methanol partially deactivates the aluminum chloride in the aryl alkanol-aluminum chloride complex, and 7 g. of paraformaldehyde is slowly added with continued stirring while the temperature rises to 35° C. The stirring is continued for one hour after addition of the paraformaldehyde.

The reaction mass is then quenched in ice water, treated with sodium hydroxide, esterified, and washed as in Example I. The organic layer so obtained is stripped to remove 660 g. of unreacted pentamethyl indane. This pentamethyl indane can be used as the starting material for the production or more aryl alkanol and isochroman. About 41 g. of the benz[f]indene is obtained. This is about a 60% yield, based upon pentamethyl indane consumption.

What is claimed is:
1. A process for the preparation of isochromans which comprises reacting a Friedel-Crafts reactant with a lower alkylene oxide in the presence of aluminum chloride to form an aryl alkanol-aluminum chloride complex, partially deactivating the aluminum chloride with a free hydroxyl material, and adding formaldehyde to cyclialkylate the aryl alkanol to an isochroman.
2. A process according to claim 1 wherein the partial deactivation is carried out with water, a lower alkanol, or a lower alkylene glycol.
3. A process according to claim 1 wherein the alkylene oxide is ethylene oxide or propylene oxide.
4. A process according to claim 1 wherein the partial deactivation is carried out with water.
5. A process according to claim 1 wherein the Friedel-Crafts reactant is an aromatic hydrocarbon.
6. A process according to claim 5 wherein the hydrocarbon is a lower alkyl substituted indane.
7. A process according to claim 5 wherein the hydrocarbon is 1,1,2,3,3-pentamethyl indane.
8. A process according to claim 1 wherein the reaction is carried out in a halogenated aromatic hydrocarbon vehicle.
9. A process according to claim 1 wherein the treatment with alkylene oxide is carried out at from about −40° C. to about 10° C.
10. A process according to claim 1 wherein the cyclialkylation is carried out at from about 20° to about 50° C.

References Cited
UNITED STATES PATENTS 2,701,254  2/1955  Hopff et al. _____ 260—345.2
3,360,530  12/1967  Heeringa et al. ____ 260—345.2

HENRY R. JILES, Primary Examiner

J. M. FORD, Assistant Examiner

U.S. Cl. X.R.
260—345.5; 252—522